(12) United States Patent
Okamoto et al.

(10) Patent No.: US 8,406,322 B2
(45) Date of Patent: Mar. 26, 2013

(54) OFDM DEMODULATION DEVICE AND METHOD

(75) Inventors: Takuya Okamoto, Chiba (JP); Taku Yamagata, Tokyo (JP); Takahiro Okada, Saitama (JP)

(73) Assignee: Sony Corporation, Tokyo (JP)

( * ) Notice: Subject to any disclaimer, the term of this patent is extended or adjusted under 35 U.S.C. 154(b) by 886 days.

(21) Appl. No.: 12/278,709

(22) PCT Filed: Feb. 6, 2007

(86) PCT No.: PCT/JP2007/052034
§ 371 (c)(1),
(2), (4) Date: Nov. 17, 2008

(87) PCT Pub. No.: WO2007/091563
PCT Pub. Date: Aug. 16, 2007

(65) Prior Publication Data
US 2009/0092197 A1 Apr. 9, 2009

(30) Foreign Application Priority Data

Feb. 9, 2006 (JP) .................................. 2006-032831

(51) Int. Cl.
*H04L 27/28* (2006.01)
(52) U.S. Cl. ..................... 375/260; 375/334; 375/346
(58) Field of Classification Search ........... 375/316–352
See application file for complete search history.

(56) References Cited

U.S. PATENT DOCUMENTS

| | | | | |
|---|---|---|---|---|
| 5,694,389 A | * | 12/1997 | Seki et al. | 375/326 |
| 6,215,819 B1 | | 4/2001 | Hyakudai et al. | |
| 7,006,430 B2 | * | 2/2006 | Harada et al. | 375/340 |
| 7,356,094 B1 | * | 4/2008 | Ikeda et al. | 375/316 |

FOREIGN PATENT DOCUMENTS

| | | |
|---|---|---|
| JP | 10-308715 | 11/1998 |
| JP | 2002-026858 | 1/2002 |

* cited by examiner

*Primary Examiner* — Sam K Ahn
*Assistant Examiner* — Janice Tieu
(74) *Attorney, Agent, or Firm* — Finnegan, Henderson, Farabow, Garrett & Dunner LLP

(57) ABSTRACT

An orthogonal frequency division multiplexed (OFDM) demodulation device for demodulating an OFDM signal is disclosed. The device includes a means that demodulates the OFDM signal to produce a baseband OFDM signal. The device also includes a means that detects a carrier frequency offset amount that is a shift amount of a center frequency of the baseband OFDM signal, based on correlation of subcarriers to which a predetermined signal is inserted. Additionally, the device includes a means that controls a frequency of the carrier signal depending on the carrier frequency offset amount. The means that detects the carrier frequency offset amount divides subcarriers into a plurality of groups, calculates a correlation value with respect to an adjacent transmission symbol for each of the groups, adds the correlation values to each other for all the groups, and defines an offset amount assumed when a maximum addition-result value is obtained as the carrier frequency offset amount.

7 Claims, 12 Drawing Sheets

PRIOR ART

PRIOR ART

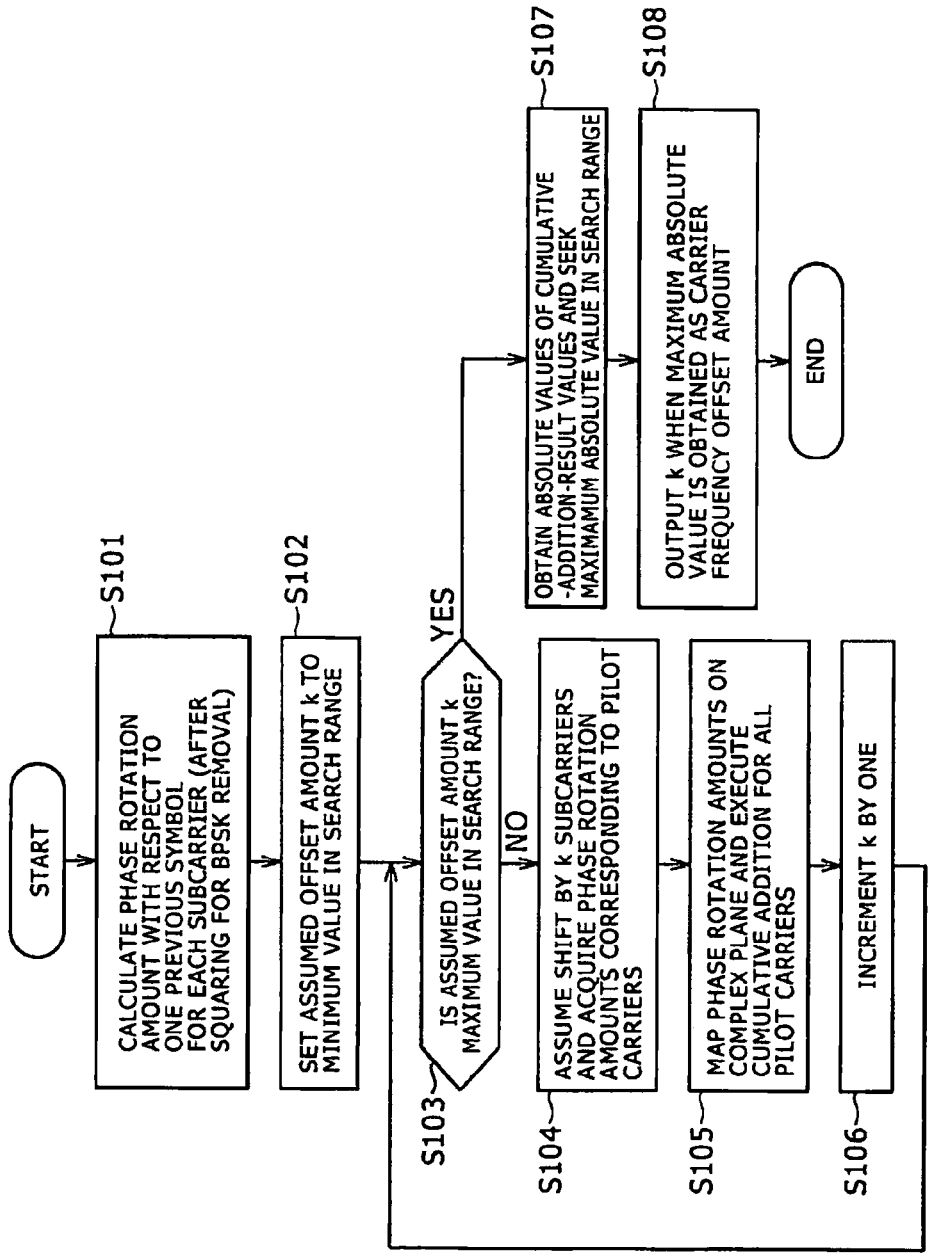

PRIOR ART

FIG.7A PHASE ROTATION AMOUNT BASED ON SAMPLING FREQUENCY OFFSET
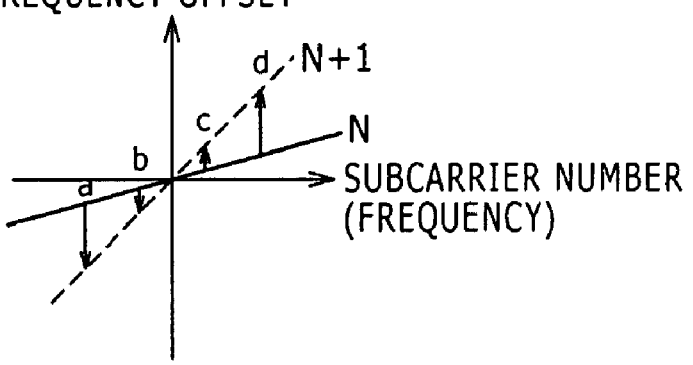
FIG.7B
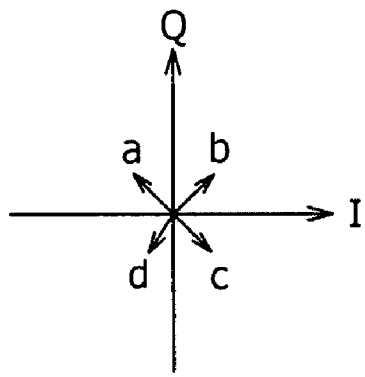
FIG.7C
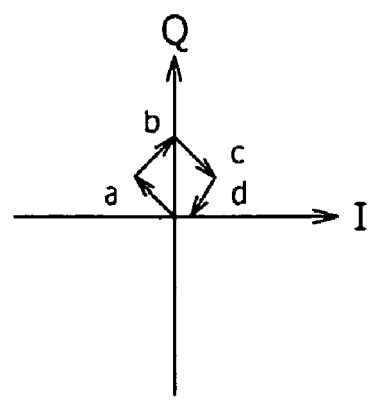

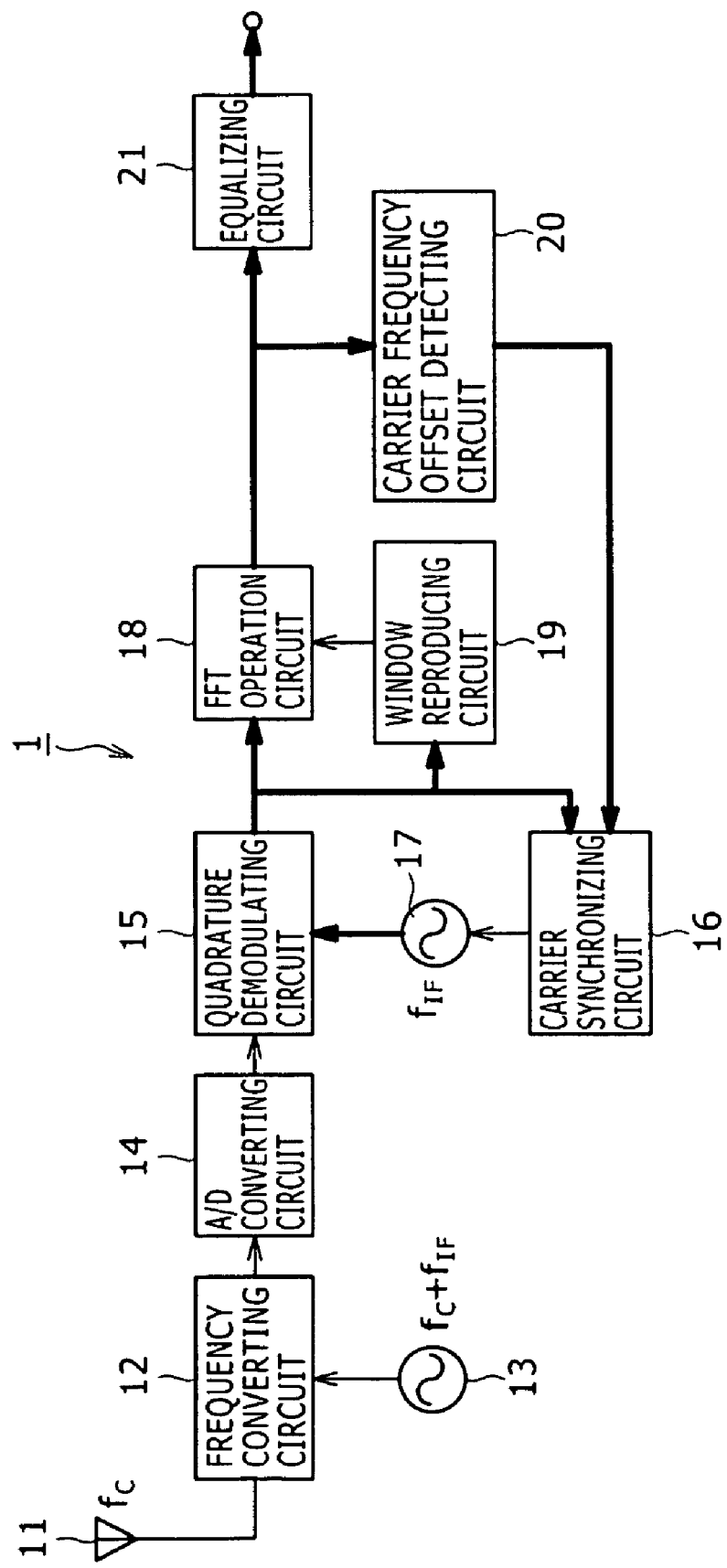

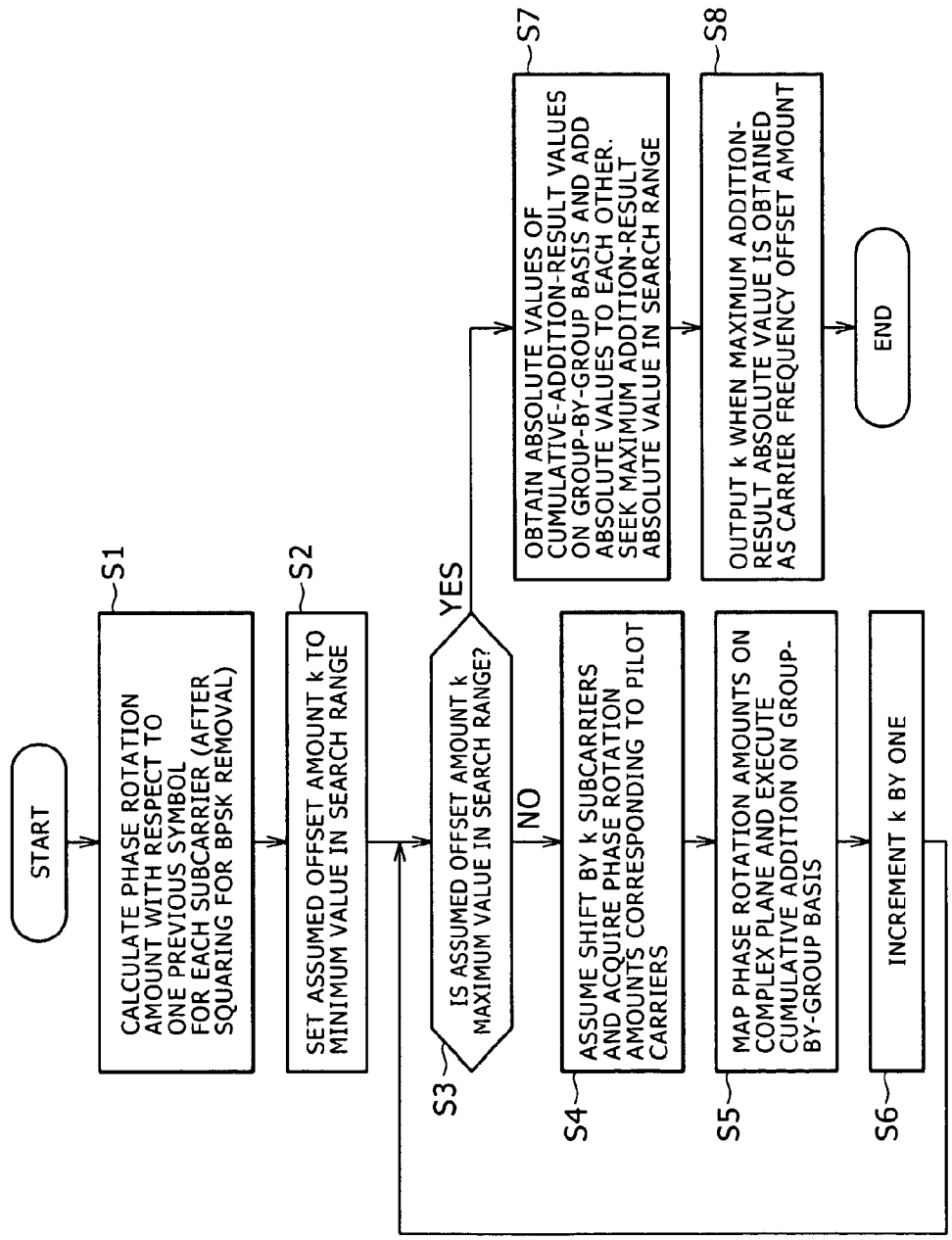

PHASE ROTATION AMOUNT BASED ON SAMPLING FREQUENCY OFFSET

OFDM DEMODULATION DEVICE AND METHOD

TECHNICAL FIELD

The present invention relates to an orthogonal frequency division multiplexed (OFDM) demodulation device and method for demodulating an OFDM signal.

The present application is to claim the right of priority on the basis of Japanese Patent Application No. 2006-32831 filed in Japan on Feb. 9, 2006, and this application is incorporated herein by reference.

BACKGROUND ART

As a system for transmitting a digital signal, a modulation system called an orthogonal frequency division multiplexing (OFDM) system (hereinafter, referred to as an OFDM system) is used. In the OFDM system, a large number of orthogonal sub-carrier waves (subcarriers) are provided in the transmission band, and digital modulation is carried out by allocating data to the amplitudes and phases of the respective subcarriers by PSK (Phase Shift Keying) and QAM (Quadrature Amplitude Modulation).

The OFDM system has a characteristic that the total transmission rate thereof is the same as that of conventional modulation systems, although the band per one subcarrier is narrow and the modulation rate is low because the transmission band is divided by a large number of subcarriers. Furthermore, in the OFDM system, the symbol rate is low because a large number of subcarriers are transmitted in parallel, which allows a short multipath time length relative to the symbol time length. Therefore, the OFDM system has a characteristic of being unsusceptible to multipath interference.

In addition, because data allocation to plural subcarriers is carried out, the OFDM system has a characteristic that a transceiving circuit can be constructed by using an IFFT (Inverse Fast Fourier Transform) operation circuit for performing an inverse Fourier transform at the time of transmission and using an FFT (Fast Fourier Transform) operation circuit for performing a Fourier transform at the time of reception.

Due to the above-described characteristics, the OFDM system is frequently applied to digital terrestrial broadcasting, which is highly susceptible to the influence of multipath interference. Examples of the standards of such digital terrestrial broadcasting for which the OFDM system is employed include DVB-T (Digital Video Broadcasting-Terrestrial), ISDB-T (Integrated Services Digital Broadcasting-Terrestrial), and ISDB-$T_{SB}$ (ISDB-T Sound Broadcasting).

As shown in FIG. 1, a transmission symbol of the OFDM system (hereinafter, referred to as an OFDM symbol) is composed of an effective symbol corresponding to the signal period during which IFFT operation is performed at the time of transmission and a guard interval obtained by copying the waveform of a part of the latter half of this effective symbol as it is. The guard interval is provided in the former half of the OFDM symbol. In the OFDM system, the provision of such a guard interval permits inter-symbol interference due to multipath and enhances the resistance against multipath.

Moreover, in the OFDM system, it is defined that one transmission unit called an OFDM frame is formed by collecting plural OFDM symbols described above. For example, in the ISDB-T standard, one OFDM frame is formed by 204 OFDM symbols. In the OFDM system, on the basis of this OFDM frame unit, the insertion positions of e.g. a scattered pilot (SP) signal (hereinafter, referred to as an SP signal) used to estimate the channel characteristic and a TMCC (Transmission and Multiplexing Configuration Control)/AC (Auxiliary Channel) signal including transmission parameters and so on are defined.

An arrangement pattern of the SP signal and the TMCC/AC signal in an OFDM frame employed in the ISDB-T standard is shown in FIG. 2. The SP signal is subjected to BPSK (Binary Phase Shift Keying) modulation and inserted at the rate of one subcarrier in twelve subcarriers along the subcarrier direction (frequency direction). Furthermore, the SP signal is inserted at the rate of one time per four OFDM symbols for identical subcarriers along the OFDM symbol direction (time direction). On the other hand, the TMCC/AC signal is subjected to differential BPSK modulation and inserted to predetermined plural subcarriers. Furthermore, the TMCC/AC signal is inserted to identical subcarriers along the OFDM symbol direction (time direction) for all the OFDM symbols.

Note that, hereinafter, a subcarrier to which the TMCC/AC signal is inserted will be referred to as a pilot carrier, and a subcarrier to which a normal data signal is inserted will be referred to as a data carrier.

By the way, in an OFDM reception device that receives an OFDM signal whose transmission unit is the above-described OFDM symbol, an original carrier arrangement like that shown in FIG. 3A is often shifted toward the lower-frequency direction as shown in FIG. 3B or shifted toward the higher-frequency direction as shown in FIG. 3C due to a carrier frequency offset. Note that only 17 subcarriers are shown in FIGS. 3A to 3C for simplification. Therefore, the OFDM reception device is needed to detect the carrier frequency offset amount and remove the influence of the carrier frequency offset.

Conventionally, as a method for detecting a carrier frequency offset amount with subcarrier accuracy, there is a method in which the correlation of the above-described pilot carriers between adjacent OFDM symbols is utilized. Details of this method are described in Kenichirou Hayashi et al., "Development of OFDM Key Techniques", Technical Report of The Institute of Image Information and Television Engineers (ITE Technical Report), Vol. 23, No. 28, pp. 25 to 30, Mar., 1999. The procedure of the detection of a carrier frequency offset amount will be described below with reference to the flowchart shown in FIG. 4.

Initially, in a step S101, the phase rotation amount with respect to the one previous OFDM symbol is calculated for each of the subcarriers of an OFDM signal obtained after quadrature demodulation. In the ideal reception state, the phase rotation amounts of pilot carriers are each 0 or 180 degrees because the pilot carriers are subjected to differential BPSK modulation, and the phase rotation amounts of data carriers are random values because the data carriers are subjected to e.g. 64 QAM modulation. In order to avoid the state in which the pilot carriers have two kinds of phase rotation amounts of 0 and 180 degrees, all the phase rotation amounts are set to 0 degrees by executing squaring processing before the calculation of the phase rotation amounts.

Subsequently, in a step S102, the assumed offset amount is defined as k, and k is set to the minimum value in the search range. The assumed offset amount k means an offset by k subcarriers from the position regarded as the center by the circuit. Subsequently, in a step S103, it is determined whether or not the assumed offset amount k is the maximum value in the search range. If it is not the maximum value, the procedure sequence proceeds to a step S104. If it is the maximum value, the procedure sequence proceeds to a step S107.

In the step S104, the phase rotation amounts of the pilot carrier positions that are defined in conformity with the standard when an offset by k subcarriers is assumed are acquired. In a step S105, the respective phase rotation amounts are mapped on a circumference having a fixed radius on a complex plane and converted to rotation vectors, and all the rotation vectors are cumulatively added to each other. Subsequently, in a step S106, k is incremented by one, so that the procedure sequence returns to the step S103.

In the step S107, the absolute values of the cumulative-addition-result values are obtained and the maximum absolute value is sought. In a step S108, the assumed offset amount k when the maximum absolute value is obtained is output as the proper carrier frequency offset amount. This operation is based on the following: when the assumed offset amount k matches the proper carrier frequency offset amount, only the rotation vectors of pilot carriers are cumulatively added and thus a large absolute value is obtained; however, when the assumed offset amount k does not match the proper carrier frequency offset amount, the rotation vectors of data carriers are cumulatively added and thus a small absolute value is obtained due to canceling-out of the rotation vectors.

For example, when the carrier frequency offset amount is −2 and k=−2, the correlations of pilot carriers between OFDM symbols are obtained as shown in FIG. 5A, and therefore the absolute value of the cumulative-addition-result value is large. In contrast, when the carrier frequency offset amount is −2 but k=+1, the correlations of data carriers between OFDM symbols are obtained as shown in FIG. 5B, and therefore the absolute value of the cumulative-addition-result value is small.

DISCLOSURE OF INVENTION

Technical Problem

The above-described method for detecting a carrier frequency offset amount is based on an assumption that the reception state is an ideal state. However, in an actual reception environment, not only a carrier frequency offset but also various offsets such as a sampling frequency offset are superimposed.

If a carrier frequency offset exists, as shown in FIG. 6A, the same phase rotation amount is added to all the subcarriers between a symbol N and a symbol N+1. Therefore, if the phase rotation amounts of the pilot carriers indicated by a, b, c, and d in the drawing are mapped on a complex plane and converted to rotation vectors as shown in FIG. 6B and all the rotation vectors are cumulatively added to each other, the absolute value of the cumulative-addition-result value is large as shown in FIG. 6C. This yields a difference from the magnitude of the absolute value of the cumulative-addition-result value obtained when the rotation vectors of data carriers are cumulatively added, which allows the detection of the carrier frequency offset as described above.

However, if a sampling frequency offset exists, as shown in FIG. 7A, the phase rotation amounts in proportion to the subcarrier number are added between the symbol N and the symbol N+1. Therefore, if the phase rotation amounts of the pilot carriers indicated by a, b, c, and d in the drawing are mapped on a complex plane and converted to rotation vectors as shown in FIG. 7B and all the rotation vectors are cumulatively added to each other, the cumulative-addition-result value is cancelled out as shown in FIG. 7C. If the distribution of the phase rotation amounts is narrow, the number of canceling components is also small. Therefore, a difference from the magnitude of the absolute value of the cumulative-addition-result value obtained when the rotation vectors of data carriers are cumulatively added is yielded, which allows the detection of the carrier frequency offset. In contrast, if the phase rotation amounts of all the subcarriers range from −n to +n, the cumulative-addition-result value is completely cancelled out, which results in failure in the detection of the carrier frequency offset.

Consequently, conventionally, in order to avoid such a problem, there is a need to detect the sampling frequency offset amount in advance and eliminate the influence of the sampling frequency offset. This causes a problem that additional circuit and processing time are required.

A technical task of the present invention is proposed in consideration of the above-described conventional circumstances, and is to provide OFDM demodulation device and method that can detect a carrier frequency offset amount without detecting a sampling frequency offset amount in advance.

One embodiment of the OFDM demodulation device according to the present invention is an OFDM demodulation device for demodulating an orthogonal frequency division multiplexed (OFDM) signal. The OFDM demodulation device has a characteristic which includes a quadrature demodulating circuit that carries out quadrature demodulation of the OFDM signal by using a carrier signal having a specific frequency to thereby produce a baseband OFDM signal, a carrier frequency offset detecting circuit that detects a carrier frequency offset amount that is the shift amount of the center frequency of the baseband OFDM signal with subcarrier accuracy, based on the correlation of subcarriers to which a predetermined signal is inserted, of a frequency-domain OFDM signal, between the transmission symbols, and a frequency controller that controls the frequency of the carrier signal depending on the carrier frequency offset amount. The carrier frequency offset detecting circuit divides subcarriers at positions at which the predetermined signal is inserted when a specific offset amount is assumed into a plurality of groups, and calculates a correlation value with respect to an adjacent transmission symbol for each of the groups. The carrier frequency offset detecting circuit adds the correlation values to each other for all the groups, and defines an offset amount assumed when the maximum addition-result value is obtained as the carrier frequency offset amount.

One embodiment of the OFDM demodulation method according to the present invention is an OFDM demodulation method for demodulating an orthogonal frequency division multiplexed (OFDM) signal whose transmission unit is a transmission symbol produced by quadrature modulation in such a way that information is divided for a plurality of subcarriers in a predetermined band. The OFDM demodulation method has a characteristic which includes a quadrature demodulating step of carrying out quadrature demodulation of the OFDM signal by using a carrier signal having a specific frequency to thereby produce a baseband OFDM signal, a Fourier transform step of performing a Fourier transform of the baseband OFDM signal in units of the transmission symbol to thereby produce a frequency-domain OFDM signal, a carrier frequency offset detecting step of detecting a carrier frequency offset amount that is the shift amount of the center frequency of the baseband OFDM signal with subcarrier accuracy, based on the correlation of subcarriers to which a TMCC (Transmission and Multiplexing Configuration Control) signal, an AC (Auxiliary Channel) signal, or a CP (Continual Pilot) signal is inserted, of the frequency-domain OFDM signal, between the transmission symbols, and a frequency control step of controlling the frequency of the carrier signal depending on the carrier frequency offset amount. In the carrier frequency offset detecting step, subcarriers at positions at which the TMCC signal, the AC signal, or the CP signal is inserted when a specific offset amount is assumed are divided into a plurality of groups. Furthermore, a correlation value with respect to an adjacent transmission symbol is calculated for each of the groups, and the correlation values are added to each other for all the groups. In addition, an offset amount assumed when the maximum addition-result value is obtained is defined as the carrier frequency offset amount.

By the OFDM demodulation device and method to which the present invention is applied, even when a sampling frequency offset exists, the carrier frequency offset amount can be detected without detecting the sampling frequency offset amount in advance.

Still other objects of the present invention and specific advantages obtained by the present invention will become more apparent from the embodiments described below with reference to drawings.

BRIEF DESCRIPTION OF DRAWINGS

FIG. 4 is a flowchart for explaining the procedure of conventional detection of a carrier frequency offset amount.

FIGS. 7A to 7C are diagrams for explaining the phase rotation amount of each subcarrier and the cumulative-addition-result value of the phase rotation amounts on a complex plane when a sampling frequency offset exists.

FIG. 8 is a block diagram of an OFDM reception device in the present embodiment.

FIG. 10 is a flowchart for explaining the procedure of detection of a carrier frequency offset amount in the OFDM reception device.

BEST MODES FOR CARRYING OUT THE INVENTION

Figure 1:
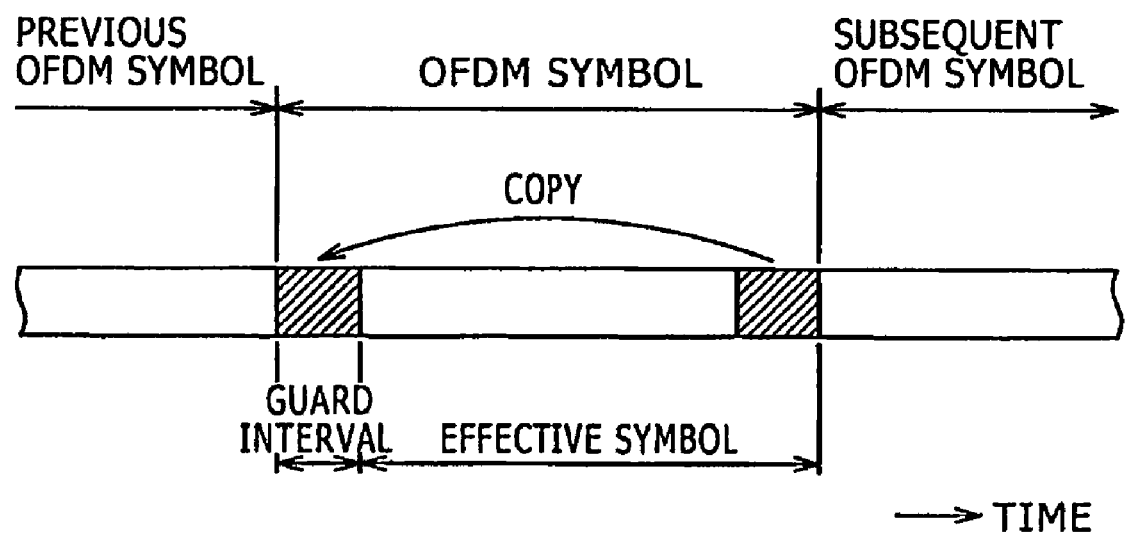
FIG. 1 is a diagram for explaining an OFDM signal, an OFDM symbol, an effective symbol, and a guard interval.
Figure 2:
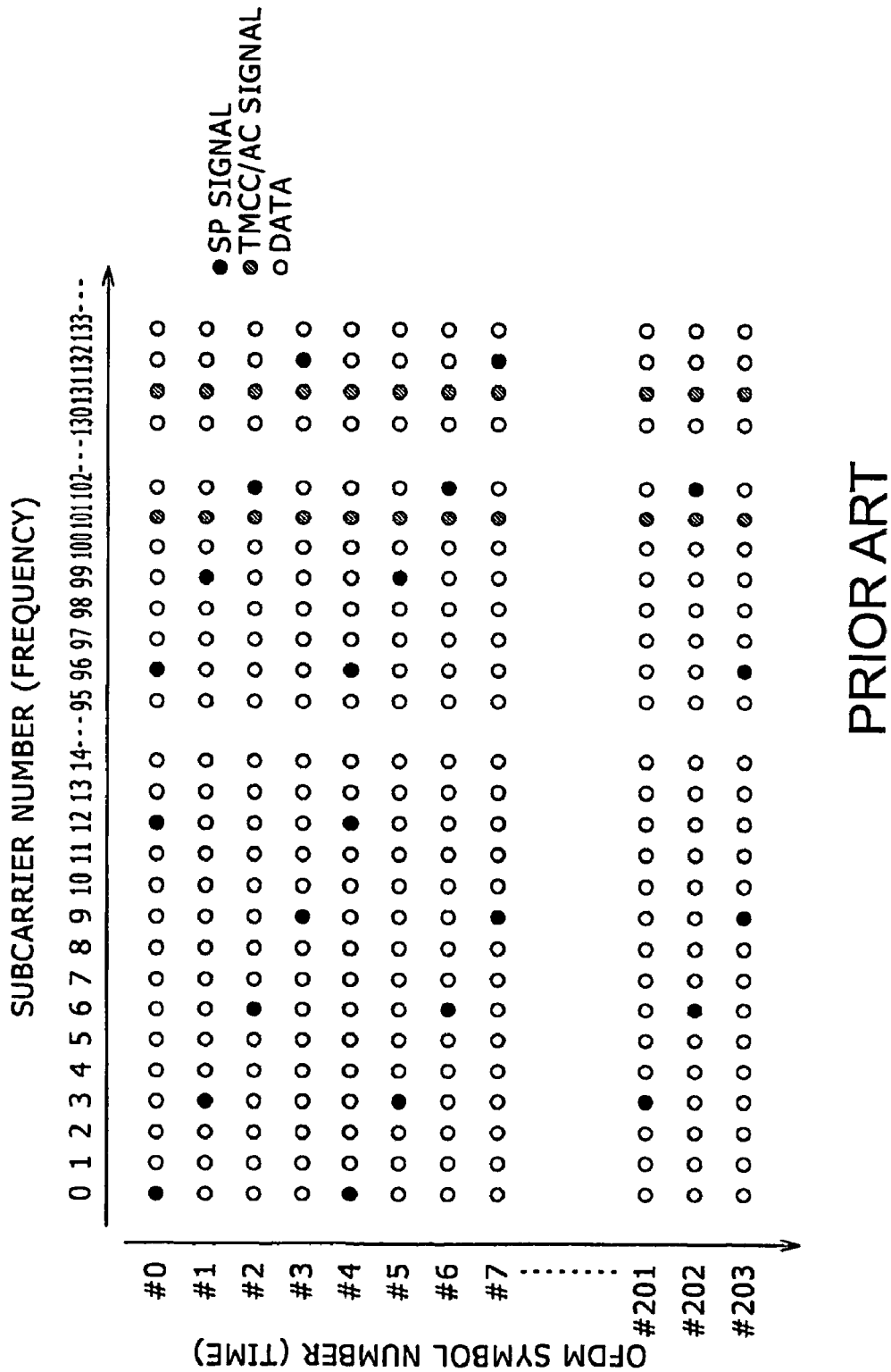
FIG. 2 is a diagram for explaining the insertion positions of an SP signal and a TMCC/AC signal in an OFDM signal.
Figure 3A:
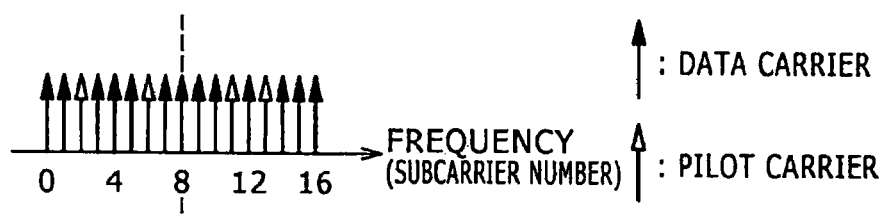
FIGS. 3A to 3C are diagrams for explaining a carrier frequency offset.
Figure 3B:
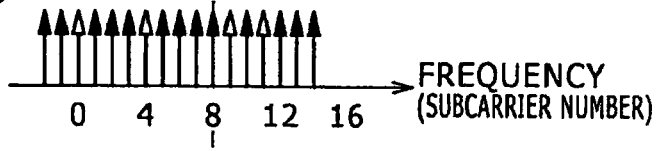
Figure 3C:
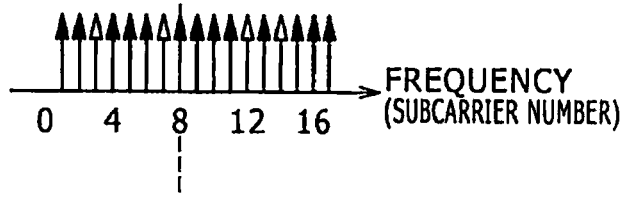
Figure 5A:
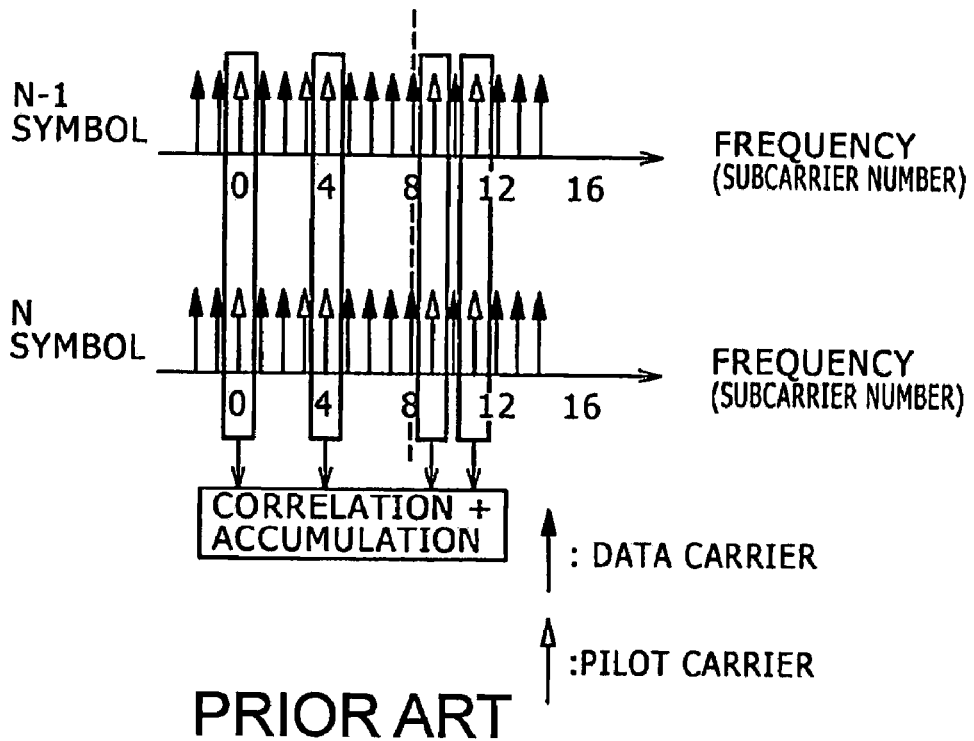
FIGS. 5A and 5B are diagrams for explaining a carrier frequency offset amount and an assumed offset amount.
Figure 5B:
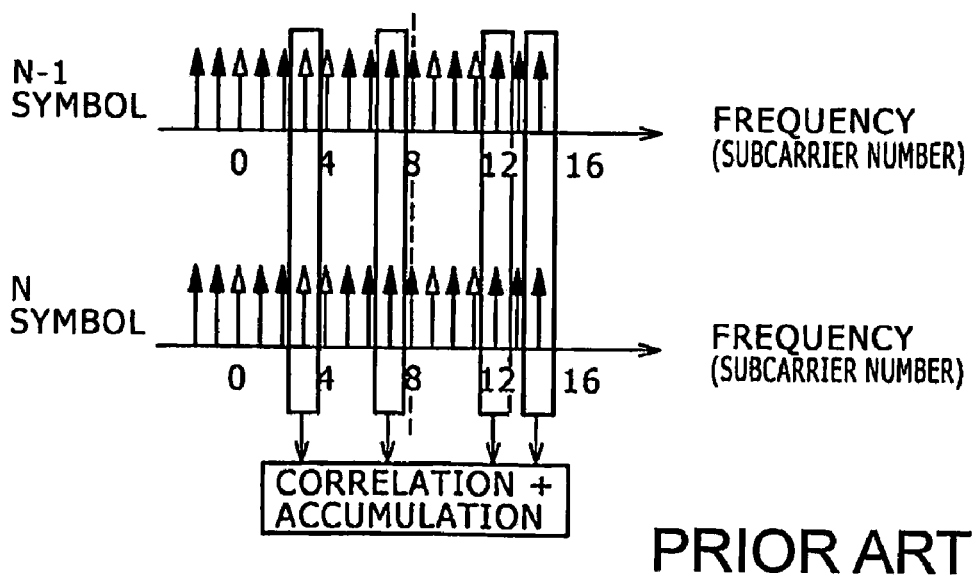
Figure 6A:
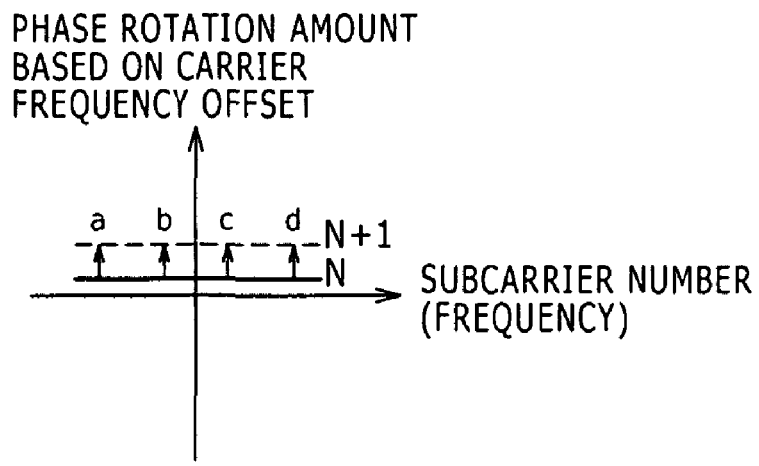
FIGS. 6A to 6C are diagrams for explaining the phase rotation amount of each subcarrier and the cumulative-addition-result value of the phase rotation amounts on a complex plane when a carrier frequency offset exists.
Figure 6B:
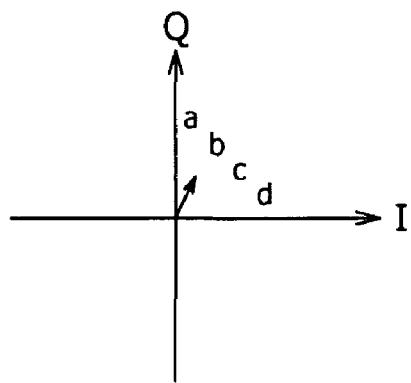
Figure 6C:
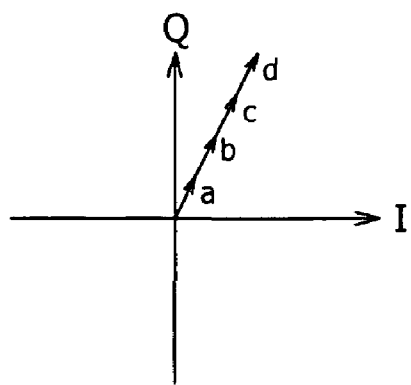

Embodiments to which the present invention is applied will be described in detail below with reference to the drawings.

Initially, the block configuration diagram of an OFDM reception device according to the present embodiment is shown in FIG. 8. Note that, in the description of the present specification, if the signal to be transmitted between blocks is a complex signal, the signal component is represented by a heavy line. If the signal to be transmitted between blocks is a real signal, the signal component is represented by a light line.

As shown in FIG. 8, an OFDM reception device 1 includes an antenna 11, a frequency converting circuit 12, a local oscillator 13, an A/D converting circuit 14, a quadrature demodulating circuit 15, a carrier synchronizing circuit 16, a local oscillator 17, an FFT operation circuit 18, a window reproducing circuit 19, a carrier frequency offset detecting circuit 20, and an equalizing circuit 21.

A transmitted wave from an OFDM transmission device is received by the antenna 11 of the OFDM reception device 1 and supplied to the frequency converting circuit 12 as an RF signal having a carrier frequency fc.

The RF signal received by the antenna 11 is multiplied by the frequency converting circuit 12 with a carrier signal that is oscillated by the local oscillator 13 and has a carrier frequency $fc+f_{IF}$ to thereby be subjected to frequency conversion into an IF signal having an intermediate frequency $f_{IF}$, followed by being supplied to the A/D converting circuit 14. The IF signal is digitalized by the A/D converting circuit 14 and supplied to the quadrature demodulating circuit 15.

The quadrature demodulating circuit 15 carries out quadrature demodulation of the digitalized IF signal by using a carrier signal that has the intermediate frequency $f_{IF}$ and is oscillated by the local oscillator 17 whose frequency is controlled by the carrier synchronizing circuit 16, to thereby output a baseband OFDM signal. The baseband OFDM signal output from the quadrature demodulating circuit 15 is a so-called time-domain signal before being subjected to FFT operation. Based on this, hereinafter, the baseband signal after the quadrature demodulation and before the FFT operation will be referred to as an OFDM time-domain signal. The OFDM time-domain signal is obtained as a complex signal including a real-axis component (I-channel signal) and an imaginary-axis component (Q-channel signal) as a result of the quadrature demodulation. The OFDM time-domain signal output by the quadrature demodulating circuit 15 is supplied to the carrier synchronizing circuit 16, the FFT operation circuit 18, and the window reproducing circuit 19.

The FFT operation circuit 18 executes the FFT operation for the OFDM time-domain signal to thereby extract and output the data carried on the respective subcarriers through the quadrature modulation. This signal output from the FFT operation circuit 18 is a so-called frequency-domain signal after being subjected to the FFT operation. Based on this, hereinafter, the signal obtained after the FFT operation will be referred to as an OFDM frequency-domain signal.

The FFT operation circuit 18 extracts the range equivalent to the effective symbol length from one OFDM symbol, e.g., signals of 2048 samples. Specifically, the FFT operation circuit 18 removes the range corresponding to a guard interval from one OFDM symbol and executes the FFT operation for the OFDM time-domain signal of the extracted 2048 samples. The specific position of the operation start is any position in the range from the boundary of the OFDM symbols and the end position of the guard interval. This operation range is referred to as an FFT window.

The OFDM frequency-domain signal thus output from the FFT operation circuit 18 is a complex signal composed of a real-axis component (I-channel signal) and an imaginary-axis component (Q-channel signal) similarly to the OFDM time-domain signal. This complex signal is a signal arising from quadrature amplitude modulation by e.g. the 16 QAM system or the 64 QAM system. The OFDM frequency-domain signal is supplied to the carrier frequency offset detecting circuit 20 and the equalizing circuit 21.

The window reproducing circuit 19 delays the OFDM time-domain signal by the effective symbol period and obtains the correlation between the guard interval part and the signal as the source of the copying for this guard interval. Based on a part having a high correlation, the window reproducing circuit 19 calculates the position of the boundary of the OFDM symbols and generates a window synchronizing signal indicating the boundary position. The window reproducing circuit 19 supplies the generated window synchronizing signal to the FFT operation circuit 18.

The carrier frequency offset detecting circuit 20 detects a carrier frequency offset amount, which is equivalent to the shift amount of the center frequency, with subcarrier accuracy based on the OFDM frequency-domain signal, and feeds back the detected carrier frequency offset amount to the carrier synchronizing circuit 16. The carrier synchronizing circuit 16 controls the oscillation frequency of the local oscillator 17 based on the fed-back carrier frequency offset amount. From then on, the carrier synchronizing circuit 16 can detect a carrier frequency offset amount with subcarrier accuracy or higher accuracy based on an OFDM time-domain signal, and can control the oscillation frequency of the local oscillator 17. Details of the carrier frequency offset detecting circuit 20 will be described later.

The equalizing circuit 21 removes an information component from the OFDM frequency-domain signal to thereby extract only an SP signal, and obtains the difference between the extracted SP signal and the reference SP signal to thereby remove the demodulated component. The SP signal from which the demodulated component is removed indicates the channel characteristic of the subcarrier to which the SP signal is inserted. The equalizing circuit 21 executes time-direction interpolation processing and frequency-direction interpolation processing for the SP signal from which the demodulated component is removed, to thereby estimate the channel characteristics of all the subcarriers in the OFDM symbol. By using the estimated channel characteristics, the equalizing circuit 21 carries out phase equalization and amplitude equalization for the OFDM frequency-domain signal. The equalizing circuit 21 outputs to the external the OFDM frequency-domain signal for which the phase equalization and the amplitude equalization have been carried out.

Next, details of the above-described carrier frequency offset detecting circuit 20 will be described below.

Figure 9A:
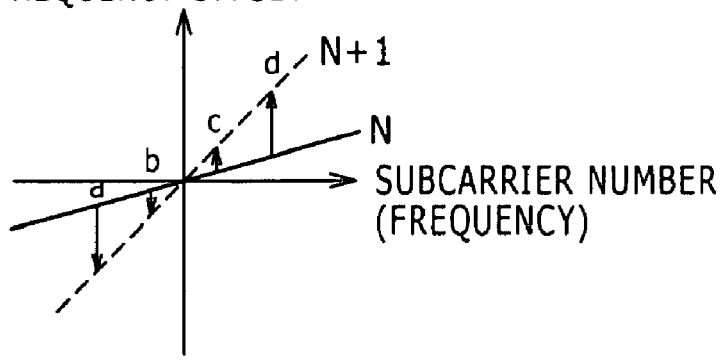
FIGS. 9A to 9C are diagrams for explaining the concept of carrier frequency offset detection in the OFDM reception device.
Figure 9B:
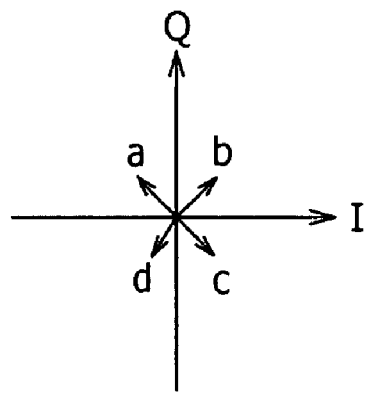

As described above, if a sampling frequency offset exists, as shown in FIG. 9A, the phase rotation amounts in proportion to the subcarrier number are added between the symbol N and the symbol N+1. Therefore, if the phase rotation amounts of the pilot carriers indicated by a, b, c, and d in the drawing are mapped on a complex plane and converted to rotation vectors as shown in FIG. 9B and all the rotation vectors are cumulatively added to each other, the cumulative-addition-result value is cancelled out, which results in failure in the detection of the carrier frequency offset.

Figure 9C:
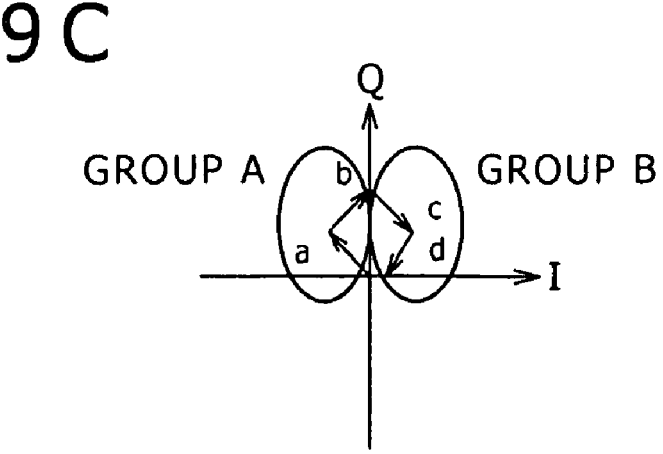

To address this problem, the carrier frequency offset detecting circuit 20 in the present embodiment does not cumulatively add all the rotation vectors based on the pilot carriers indicated by a, b, c, and d shown in the drawing. Instead, as shown in FIG. 9C, the carrier frequency offset detecting circuit 20 regards a and b as a group A and regards c and d as a group B for example, and executes the cumulative addition of rotation vectors in the group. Subsequently, the carrier frequency offset detecting circuit 20 adds the absolute values of the cumulative-addition-result values obtained on a group-by-group basis to each other for all the groups. This can prevent a situation in which the carrier frequency offset can not be detected due to the cancelling-out of the cumulative-addition-result value and hence a small final absolute value thereof.

The procedure of the detection of a carrier frequency offset amount by the carrier frequency offset detecting circuit 20 will be described below with reference to the flowchart shown in FIG. 10.

Initially, in a step S1, the phase rotation amount with respect to the one previous OFDM symbol is calculated for each of the subcarriers of an OFDM time-domain signal. In the ideal reception state, the phase rotation amounts of pilot carriers are each 0 or 180 degrees because the pilot carriers are subjected to differential BPSK modulation, and the phase rotation amounts of data carriers are random values because the data carriers are subjected to e.g. 64 QAM modulation. Note that, in order to avoid the state in which the pilot carriers have two kinds of phase rotation amounts of 0 and 180 degrees, all the phase rotation amounts are set to 0 degrees by executing squaring processing before the calculation of the phase rotation amounts.

Subsequently, in a step S2, the assumed offset amount is defined as k, and k is set to the minimum value in the search range. The assumed offset amount k means an offset by k subcarriers from the position regarded as the center by the circuit. Subsequently, in a step S3, it is determined whether or not the assumed offset amount k is the maximum value in the search range. If it is not the maximum value, the procedure sequence proceeds to a step S4. If it is the maximum value, the procedure sequence proceeds to a step S7.

In the step S4, the phase rotation amounts of the pilot carrier positions that are defined in conformity with the standard when an offset by k subcarriers is assumed are acquired. In a step S5, the respective phase rotation amounts are mapped on a circumference having a fixed radius on a complex plane and converted to rotation vectors, and the rotation vectors are cumulatively added to each other on a group-by-group basis. Subsequently, in a step S6, k is incremented by one, so that the procedure sequence returns to the step S3.

In the step S7, the absolute values of the cumulative-addition-result values are obtained on a group-by-group basis and the obtained absolute values are added to each other for all the groups. In addition, the maximum addition-result absolute value is sought. In a step S8, the assumed offset amount k when the maximum addition-result absolute value is obtained is output as the proper carrier frequency offset amount. This operation is based on the following: when the assumed offset amount k matches the proper carrier frequency offset amount, only the rotation vectors of pilot carriers are cumulatively added and thus a large addition-result absolute value is obtained; however, when the assumed offset amount k does not match the proper carrier frequency offset amount, the rotation vectors of data carriers are cumulatively added and thus a small addition-result absolute value is obtained due to canceling-out of the rotation vectors.

In this way, the carrier frequency offset detecting circuit 20 divides pilot carriers into plural groups, and obtains the absolute values of the cumulative-addition-result values on a group-by-group basis, to add the absolute values to each other for all the groups. Due to this feature, even when a sampling frequency offset exists, it is possible to prevent a situation in which the carrier frequency offset can not be detected due to the cancelling-out of the cumulative-addition-result value and hence a small final absolute value thereof.

The number of groups when pilot carriers are divided into plural groups can be set to any number. However, it is preferable to optimize the number of groups on a system-by-system basis, because a larger number of groups requires a larger memory size although leading to a smaller number of cancelling components.

In addition, each group arising from the division of pilot carriers does not necessarily include subcarriers close to each other. However, a larger interval between subcarrier numbers leads to a larger number of cancelling components when a sampling frequency offset exists. Therefore, it is preferable to collect subcarriers close to each other into the same group.

By the way, in the above-described method for detecting a carrier frequency offset, the carrier frequency offset amount can be detected without detecting the sampling frequency offset amount in advance. However, if additional circuit and processing time are permitted, the carrier frequency offset amount may be detected after the influence of a sampling frequency offset is removed.

Figure 11:
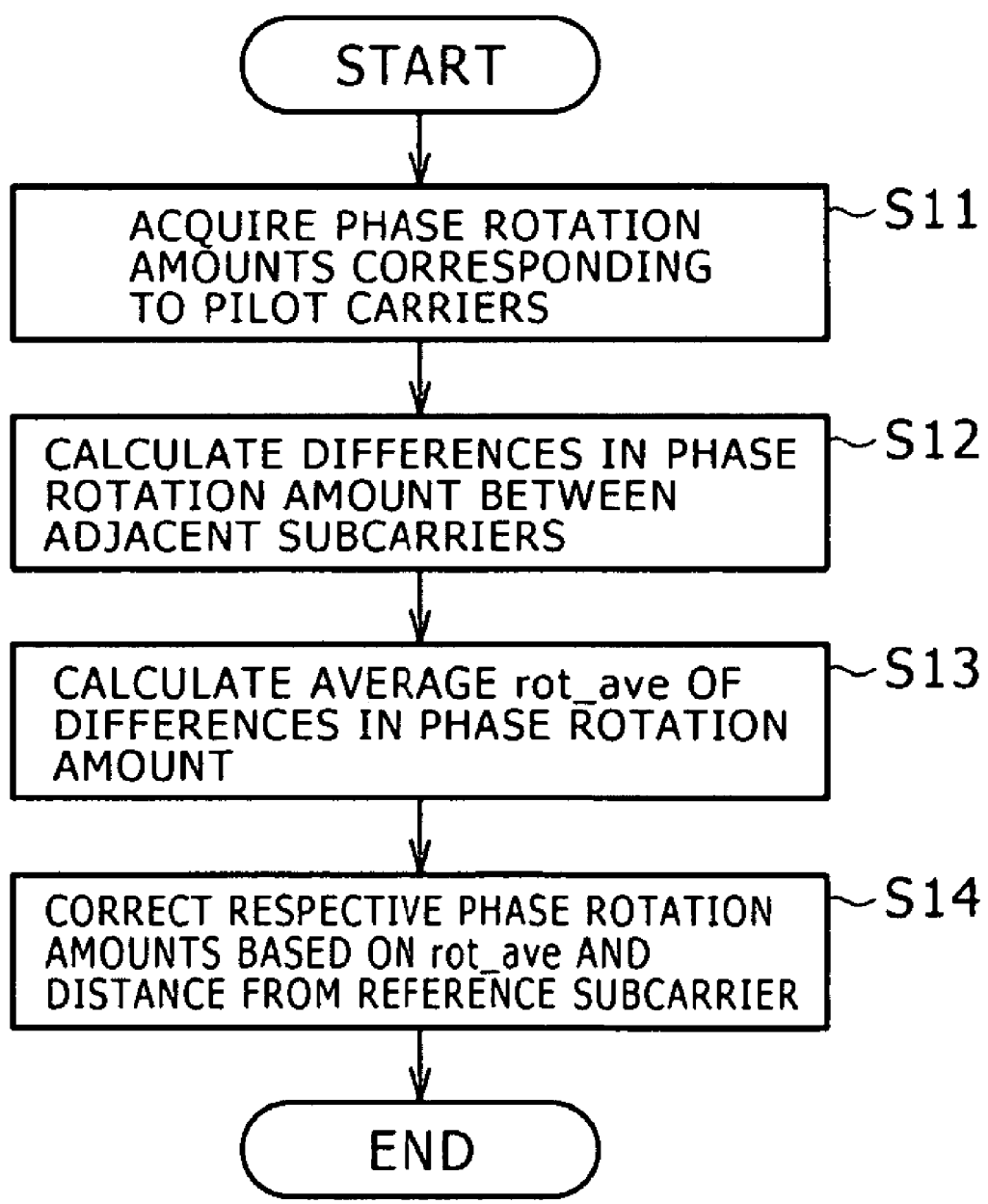
FIG. 11 is a flowchart for explaining the procedure of removal of the influence of a sampling frequency offset from the phase rotation amounts of pilot carriers.

The procedure of the removal of the influence of a sampling frequency offset will be described below with reference to the flowchart shown in FIG. 11.

Initially, in a step S11, the phase rotation amounts of the pilot carrier positions that are defined in conformity with the standard when an offset by k subcarriers is assumed as described above are acquired. In a step S12, the differences in the phase rotation amount between adjacent pilot carriers are calculated.

Subsequently, in a step S13, the average rot_ave of the differences in the phase rotation amount is calculated.

In a step S14, based on the average rot_ave of the differences in the phase rotation amount and the distance from the pilot carrier serving as the reference, the phase rotation amounts of the respective pilot carriers are corrected.

Figure 12A:
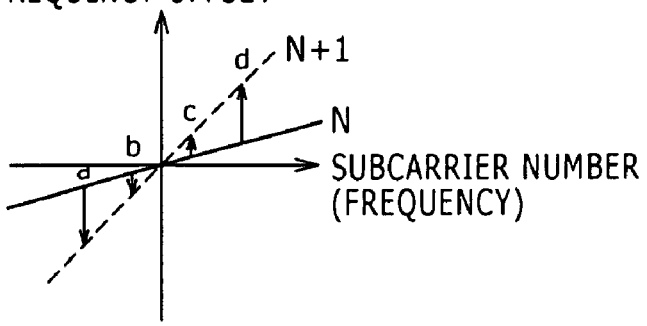
FIGS. 12A to 12D are diagrams for explaining one example of removal of the influence of a sampling frequency offset from the phase rotation amounts of pilot carriers.
Figure 12B:
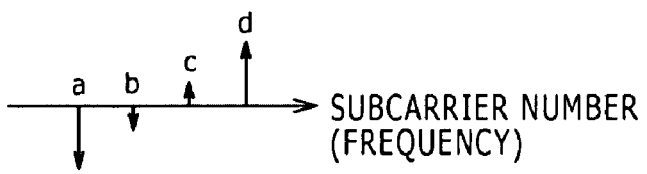
Figure 12C:
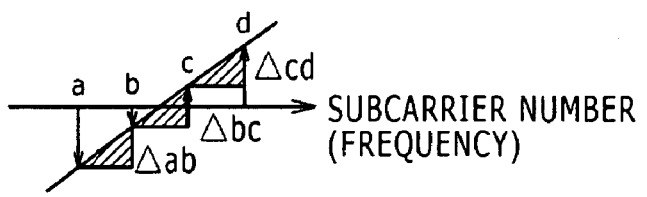
Figure 12D:
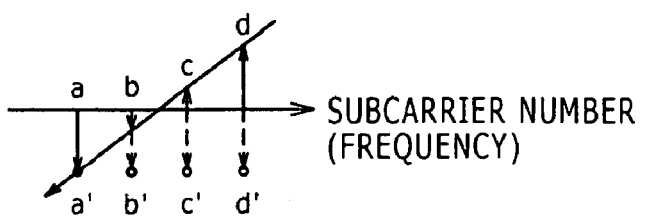

For example, a description will be made below about the case in which a sampling frequency offset exists and the phase rotation amounts in proportion to the subcarrier number are added between the symbol N and the symbol N+1 as shown in FIG. 12A. The phase rotation amounts of the pilot carriers indicated by a, b, c, and d in the drawing are as shown in FIG. 12B. In the steps S12 and S13, as shown in FIG. 12C, the differences in the phase rotation amount between adjacent pilot carriers Δab, Δbc, and Δcd are calculated, and the average rot_ave=(Δab+Δbc+Δcd)/3 is calculated. Subsequently, in the step S14, based on the average rot_ave and the distance from the reference pilot carrier, the phase rotation amounts of the respective pilot carriers are corrected. If the pilot carrier indicated by a in the drawing is used as the reference and the phase rotation amounts of the pilot carriers indicated by a, b, c, and d in the drawing are represented by using a, b, c, and d, respectively, the phase rotation amounts a', b', c', and d' after the correction are represented by the equations shown below.

$$a'=a$$

$$b'=b+rot\_ave \times 1$$

$$c'=c+rot\_ave \times 2$$

$$d'=d+rot\_ave \times 3$$

Thereafter, similarly to the above description, the phase rotation amounts after the correction are mapped on a circumference having a fixed radius on a complex plane and converted to rotation vectors, followed by cumulative addition of all the rotation vectors. In this method, pilot carriers do not need to be divided into plural groups unlike the above-described method, because the influence of a sampling frequency offset is removed.

Hereinbefore, several embodiments of the present invention have been described. However, it should be obvious that the present invention is not limited only to the above-described embodiments but various changes can be made without departing from the gist of the present invention.

For example, in the above-described embodiment, the phase rotation amounts of the subcarriers to which a TMCC signal or an AC signal is inserted are used for detection of a carrier frequency offset. However, the present invention is not limited thereto but the phase rotation amounts of the subcarriers to which a CP (Continual Pilot) signal is inserted may be used.

The invention claimed is:

1. An orthogonal frequency division multiplexed (OFDM) demodulation device for demodulating an OFDM signal, the OFDM demodulation device comprising:
   quadrature demodulating means that carries out quadrature demodulation of the OFDM signal by using a carrier signal having a specific frequency to thereby produce a baseband OFDM signal;
   carrier frequency offset detecting means that detects a carrier frequency offset amount that is a shift amount of a center frequency of the baseband OFDM signal with subcarrier accuracy, based on correlation of subcarriers to which a predetermined signal is inserted, of a frequency-domain OFDM signal, between the transmission symbols; and
   frequency control means that controls a frequency of the carrier signal depending on the carrier frequency offset amount,
   wherein for a plurality of assumed offset amounts, the carrier frequency offset detecting means divides subcarriers at positions at which the predetermined signal is inserted when each assumed offset amount is assumed into a plurality of groups, and calculates a correlation value with respect to an adjacent transmission symbol for each of the groups for the corresponding assumed offset amount, and
   the carrier frequency offset detecting means adds the correlation values of the respective groups to each other to obtain an addition-result value for each offset amount, and defines the assumed offset amount associated with a maximum addition-result value the carrier frequency offset amount.

2. The OFDM demodulation device according to claim 1, wherein the predetermined signal includes at least any of a TMCC (Transmission and Multiplexing Configuration Control) signal, an AC (Auxiliary Channel) signal, or a CP (Continual Pilot) signal.

3. The OFDM demodulation device according to claim 1, the OFDM signal being obtained as a time-domain signal through execution of an inverse Fourier transform on a transmission side, the OFDM demodulation device further comprising Fourier transform means that performs a Fourier transform of the baseband OFDM signal in units of the transmission symbol to thereby produce a frequency-domain OFDM signal.

4. The OFDM demodulation device according to claim 2, wherein the carrier frequency offset detecting means divides subcarriers at positions at which the TMCC signal, the AC signal, or the CP signal is inserted when a specific offset amount is assumed into a plurality of groups, the carrier frequency offset detecting means maps squares of phase rotation amounts with respect to an immediately-previous transmission symbol on a complex plane and converts the squares to rotation vectors, the carrier frequency offset detecting means cumulatively adds the rotation vectors to each other for each of the groups to thereby calculate absolute values of cumulative-addition-result values, and adds the absolute values of the cumulative-addition-result values calculated on a group-by-group basis to each other for all the groups to thereby calculate an addition-result absolute value, and the carrier frequency offset detecting means defines an offset amount assumed when a maximum addition-result absolute value is obtained as the carrier frequency offset amount.

5. An orthogonal frequency division multiplexed (OFDM) demodulation device for demodulating an OFDM signal whose transmission unit is a transmission symbol produced by quadrature modulation in such a way that information is divided for a plurality of subcarriers in a predetermined band, the OFDM demodulation device comprising:

a quadrature demodulating circuit that carries out quadrature demodulation of the OFDM signal by using a carrier signal having a specific frequency to thereby produce a baseband OFDM signal;

an FFT (Fast Fourier Transform) operation circuit that performs a Fourier transform of the baseband OFDM signal in units of the transmission symbol to thereby produce a frequency-domain OFDM signal;

a carrier frequency offset detecting circuit that detects a carrier frequency offset amount that is a shift amount of a center frequency of the baseband OFDM signal with subcarrier accuracy, based on correlation of subcarriers to which a TMCC (Transmission and Multiplexing Configuration Control) signal, an AC (Auxiliary Channel) signal, or a CP (Continual Pilot) signal is inserted, of the frequency-domain OFDM signal, between the transmission symbols; and a carrier synchronizing circuit that controls a frequency of the carrier signal depending on the carrier frequency offset amount, wherein for a plurality of assumed offset amounts, the carrier frequency offset detecting circuit divides subcarriers at positions at which the TMCC signal, the AC signal, or the CP signal is inserted when each assumed offset amount is assumed into a plurality of groups, and calculates a correlation value with respect to an adjacent transmission symbol for each of the groups for the corresponding assumed offset amount, and the carrier frequency offset detecting means adds the correlation values of the respective groups to each other to obtain an addition-result value for each offset amount, and defines the assumed offset amount associated with a maximum addition-result value the carrier frequency offset amount.

6. An orthogonal frequency division multiplexed (OFDM) demodulation method for demodulating an OFDM signal whose transmission unit is a transmission symbol produced by quadrature modulation in such a way that information is divided for a plurality of subcarriers in a predetermined band, the OFDM demodulation method comprising:

a quadrature demodulating step of carrying out quadrature demodulation of the OFDM signal by using a carrier signal having a specific frequency to thereby produce a baseband OFDM signal;

a Fourier transform step of performing a Fourier transform of the baseband OFDM signal in units of the transmission symbol to thereby produce a frequency-domain OFDM signal;

a carrier frequency offset detecting step of detecting a carrier frequency offset amount that is a shift amount of a center frequency of the baseband OFDM signal with subcarrier accuracy, based on correlation of subcarriers to which a TMCC (Transmission and Multiplexing Configuration Control) signal, an AC (Auxiliary Channel) signal, or a CP (Continual Pilot) signal is inserted, of the frequency-domain OFDM signal, between the transmission symbols; and a frequency control step of controlling a frequency of the carrier signal depending on the carrier frequency offset amount, wherein in the carrier frequency offset detecting step, for a plurality of assumed offset amounts, subcarriers at positions at which the TMCC signal, the AC signal, or the CP signal is inserted when each assumed offset amount is assumed are divided into a plurality of groups, a correlation value with respect to an adjacent transmission symbol is calculated for each of the groups for the corresponding assumed offset amount, the correlation values of the respective groups are added to each other to obtain an addition-result value for each offset amount, and the assumed offset amount associated with a maximum addition-result value is defined as the carrier frequency offset amount.

7. The OFDM demodulation method according to claim 6, wherein in the carrier frequency offset detecting step, subcarriers at positions at which the TMCC signal, the AC signal, or the CP signal is inserted when a specific offset amount is assumed are divided into a plurality of groups, squares of phase rotation amounts with respect to an immediately-previous transmission symbol are mapped on a complex plane and converted to rotation vectors, the rotation vectors are cumulatively added to each other for each of the groups to thereby calculate absolute values of cumulative-addition-result values, the absolute values of the cumulative-addition-result values calculated on a group-by-group basis are added to each other for all the groups to thereby calculate an addition-result absolute value, and an offset amount assumed when a maximum addition-result absolute value is obtained is defined as the carrier frequency offset amount.

* * * * *